No. 851,623. PATENTED APR. 23, 1907.
C. W. GIBBS.
DEVICE FOR PLACING AND RETAINING TAPS IN TAPPING MACHINES.
APPLICATION FILED JULY 7, 1906.

WITNESSES
H. A. Lamb.
S. W. Atherton.

INVENTOR
Charles W. Gibbs
BY
A. M. Wooster
ATTORNEY

UNITED STATES PATENT OFFICE.

CHARLES W. GIBBS, OF BRIDGEPORT, CONNECTICUT.

DEVICE FOR PLACING AND RETAINING TAPS IN TAPPING-MACHINES.

No. 851,623.     Specification of Letters Patent.     Patented April 23, 1907.

Application filed July 7, 1906. Serial No. 325,147.

*To all whom it may concern:*

Be it known that I, CHARLES W. GIBBS, a citizen of the United States, residing at Bridgeport, county of Fairfield, State of Connecticut, have invented a new and useful Device for Placing and Retaining Taps in Tapping-Machines, of which the following is a specification.

This invention relates to tapping machines and has particular reference to means for facilitating the proper placing of a tap in its chuck or holder so that it will be securely held thereby. As is well known, the lubricant which is employed to facilitate the cutting of screw threads renders the tapping tool difficult to insert in the chuck because of the liability of the hand of the workman to slip. This device insures the proper placing of the tap in the chuck regardless of the amount of oil which may be on the tool.

Another object of the invention is to provide such a structure that the work will be automatically removed or carried beyond the cutting portions of the tap as soon as the work is finished.

To these ends the invention consists in the construction and combination of parts substantially as hereinafter described and claimed.

Figure 1:
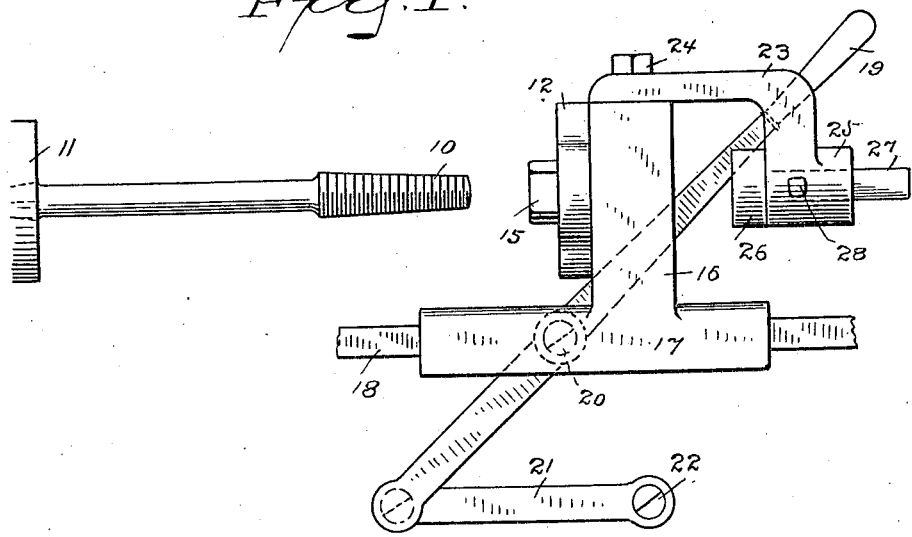
Figure 2:
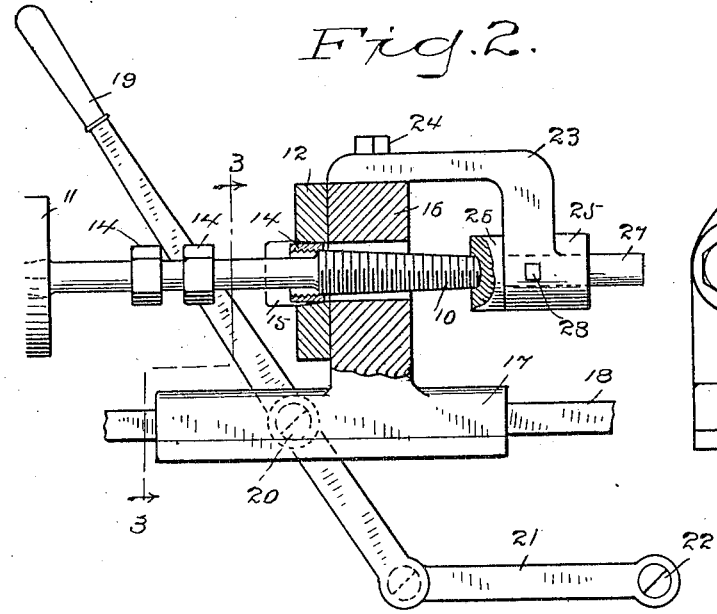
Figure 3:
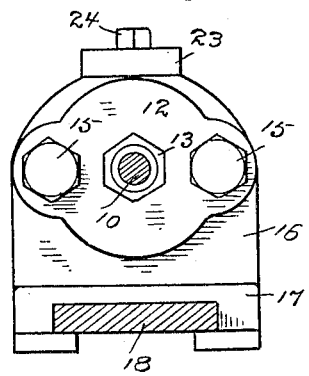

Of the accompanying drawings:—Figure 1 is an elevation of so much of the parts of a tapping machine having my improvements applied thereto as will be necessary to an understanding of the invention; Fig. 2 a view similar to Fig. 1, but partly broken out and showing the work-carrier in a different position; and Fig. 3 represents a section on line 3—3 of Fig. 2.

Similar reference characters indicate the same or similar parts in all of the views.

A tap of an ordinary form is represented at 10, and the chuck or holder therefor at 11. The work-holder 12, having a recess 13 for the work 14 (such as a nut), is secured by bolts 15 to the body 16 of the carrier. The base or slide 17 of the carrier is mounted upon the way 18, so as to be reciprocated toward and from the tap, as is usual in tapping machines.

The hand lever 19 is pivotally connected at 20 to the base or slide 17, and the lower end of said lever is pivotally connected with a link 21 which is pivoted at 22 to a fixed point of the tapping machine, as usual. The body 16 of the carrier is of course formed with the usual aperture to permit the passage of the tap, and the recess for the work is preferably slightly tapered, as shown in Fig. 2, and is of an angular form, as shown in Fig. 3, to prevent the work from rotating in the holder.

My improved attachment comprises an arm or bracket 23 suitably secured to the carrier as by a bolt or screw 24 passing through the said arm into the top of the body 16. It is to be understood, however, that I do not limit myself to this particular location or means of attachment of the arm or bracket 23. The other end of the bracket is shown as formed with the hub 25 having an aperture in alinement with the aperture for the tap formed in the carrier. The pusher or stop comprises a head 26 having its shank 27 extending through the aperture in the hub 25, a set screw 28 extending through the hub and bearing against the shank 27 to secure said stop or pusher in position. The face of the head 26 is preferably formed with a shallow recess adapted to just receive the extreme end of the tap when the parts are in the position shown in Fig. 2. Said recess 29 may, however, be omitted, the end of the tap then bearing against a flat surface or face of the head 26. Owing to the fact that the shank 27 of the pusher or stop passes through the aperture in the hub 25 and is secured therein by the said screw 28, the head 26 of said shank may be adjusted to vary the distance between it and the work holder. Therefore a tap of a different length from the one illustrated in the drawings may be employed and the stop or pusher set or adjusted so that the work holder will be stopped at the proper time to cause the nut or other work to be pushed off on to the shank of the tap when the parts are operated as hereinafter described.

When the tap is to be inserted in its chuck or holder, it is held in position in front of said chuck and may be inserted in the chuck as far as the workman can conveniently place it. Then, with the other hand, the workman grasps the lever 19 and slides the carrier from the position shown in Fig. 1 to the position shown in Fig. 2. This brings the pusher or stop against the end of the tap with all of the force necessary to push the tap home in the chuck, after which the device is ready for use in forming threads in nuts or similar articles. After the tap is properly placed in the chuck, the carrier is returned to the position shown in Fig. 1 and the nut or other piece of work to be threaded is inserted in the work-holder. A second operation of the lever 19 toward the position shown in Fig. 2 carries the work on to the tap and the threading of the work will proceed in the usual manner. The pusher or stop, however, is set at such a distance from the work-holder that the head 26 will contact with the end of the tap, as shown in Fig. 2, just before the last thread in the work is completed. Since the work-holder can move no farther, the continued rotation of the tap will force the work out of the recess 13 so that it will slide on to the shank of the tap. In Fig. 2, two completed nuts are shown in elevation as strung upon the shank of the tap, while a third nut is shown in section as being just completed and ready to be pushed toward the left and freed from the threads of the tap by the continued rotation of the latter. As each piece of work is completed and strung upon the shank of the tap, the carrier will be, of course, shifted to the position shown in Fig. 1 and a new piece of work inserted in the holder, and then the carrier returned toward the position shown in Fig. 2. The operation is repeated until as many nuts or other pieces of work are completed as can be strung upon the shank of the tap, after which the tap will be removed from its chuck or holder and the several nuts slid off from its angular end. Then the tap is pushed into place again in its chuck by the operation of the pusher, as has been described.

Having now described my invention I claim:

1. An attachment for tapping machines comprising a movable work-carrier having a recess to normally hold the work, and an arm or bracket connected with said work-carrier, and having a stop or pusher adapted to engage the end of a tap to cause the tap to release the work from said recess.

2. In a tapping machine, the combination with a movable work-carrier having a recess to normally hold the work, and provided with an aperture for the passage of a tap, of an arm or bracket secured to the carrier and having its end in alinement with the tap aperture in the carrier, the free end of the arm being apertured, and a head having a shank extending through the aperture of the bracket and secured therein, whereby the engagement of the tap and head will release the work.

3. In a tapping machine, the combination with a movable work-holder having a recess for the work and an aperture for the tap, of a stop mounted on said carrier in alinement with the aperture in the work holder and adapted to limit the movement of the work-holder, whereby continued rotation of the tap will withdraw the work from said recess and feed it on to the shank of the tap.

4. In a tapping machine, the combination with the work-holder having a recess for the work and an aperture for the tap, of means for manually reciprocating the holder, a bracket secured to the holder and having its free end in alinement with the tap aperture, and a shank extending through an aperture in the free end of the bracket and having a head facing toward the tap aperture of the work-holder, means being provided to adjust the position of the shank in the bracket aperture to vary the distance of the shank head from the work-holder.

In testimony whereof I affix my signature, in presence of two witnesses.

CHARLES W. GIBBS.

Witnesses:
A. M. WOOSTER,
S. W. ATHERTON.